US006798184B2

(12) United States Patent
Honda

(10) Patent No.: US 6,798,184 B2
(45) Date of Patent: Sep. 28, 2004

(54) INTEGRATED SENSOR DEVICE AND MEASURING SYSTEM USING THE SAME

(75) Inventor: Nobuaki Honda, Tokyo (JP)

(73) Assignee: Yamatake Corporation, Tokyo (JP)

( * ) Notice: Subject to any disclaimer, the term of this patent is extended or adjusted under 35 U.S.C. 154(b) by 19 days.

(21) Appl. No.: 10/069,776

(22) PCT Filed: Jun. 27, 2001

(86) PCT No.: PCT/JP01/05510

§ 371 (c)(1), (2), (4) Date: Feb. 28, 2002

(87) PCT Pub. No.: WO02/01215

PCT Pub. Date: Jan. 3, 2002

(65) Prior Publication Data

US 2003/0102872 A1 Jun. 5, 2003

(30) Foreign Application Priority Data

Jun. 29, 2000 (JP) ....................................... 2000-195465

(51) Int. Cl.[7] ................................................ G01N 27/00
(52) U.S. Cl. ....................................... 324/71.5; 204/418
(58) Field of Search ......................... 324/92, 438, 71.5; 257/252, 253; 204/403.06, 406, 415, 418, 403.11; 435/291

(56) References Cited

FOREIGN PATENT DOCUMENTS

| | | | | |
|---|---|---|---|---|
| EP | 442674 A | 9/1991 | | |
| JP | 3-84448 A | 4/1991 | | |
| JP | 3-125252 U | 12/1991 | | |
| JP | 404363651 A | * 12/1992 | | ................ 201/416 |
| JP | 6-288972 A | 10/1994 | | |
| JP | 11-311615 A | 11/1999 | | |
| JP | 00-146896 A | 5/2000 | | |

* cited by examiner

*Primary Examiner*—Anjan Deb
*Assistant Examiner*—Donald M Lair
(74) *Attorney, Agent, or Firm*—Venable LLP; Andrew C. Aitken

(57) ABSTRACT

An integrated sensor device having a structure suited for mass production despite of a short lifetime and automatically replaceable, and a measuring system realizing a continuous monitoring at a low cost by using the integrated sensor device are disclosed. The integrated sensor device is constructed into a signal integrated circuit device comprising a sensor unit (6) for measuring a change in the quantity or concentration of a substance; a control unit (7) for processing a signal representing the measurement result; and an antenna unit (10) for transmitting the processed signal to the outside and for receiving an energy necessary for the transmission and the operations of the sensor unit (6) and the control unit (7).

13 Claims, 10 Drawing Sheets

INTEGRATED SENSOR DEVICE AND MEASURING SYSTEM USING THE SAME

FIELD OF THE INVENTION

The present invention relates to an integrated sensor device for measuring a change in quantity of a substance to be measured, and also relates to a measuring system using the device.

BACKGROUND ART

Various sensors used for detecting (or measuring) the quantity (or the concentration) of a substance have been disclosed in the prior art. For example, an integrated ion sensor that has an ion sensible membrane, a signal processing circuit and a reference electrode mounted on one-chip is disclosed in Japanese Patent Laid-Open Publication No. 4-363651. This integrated ion sensor has a plurality of connection terminals for supplying power and collecting measurement results through lines connected to the terminals.

Also, the sensors disclosed in Japanese Patent Laid-Open Publication No. 6-42983 and Japanese Patent Laid-Open Publication No. 11-311615 are constructed to transmit or receive the measurement result and energy for driving the sensor by wireless communication between the sensor and outside devices.

Generally the lifetime of such sensors is finite. That is, the performance of a sensor gradually deteriorates over time as a result of its exposure in the environment in which it is located. Particularly, chemical sensors and biosensors which are used for the detection of substances are generally not stable for long periods of time. Accordingly, it is necessary to replace the deteriorated sensor and, the shorter the lifetime of the sensor, the more frequently it must be the replaced. Japanese Patent Laid-Open Publication No. 9-297832 discloses a measuring instrument that automatically decides a lifetime of a sensor and informs the necessity of replacement to a worker. This feature may be advantageous because it is troublesome for the worker to judge the deterioration of the sensor.

However, there are problems in the conventional sensors as follows:

As described in Japanese Patent Laid-Open Publication No. 6-42983, a sensor having assembly of a plurality of boards, on which electrical circuits are arranged for processing the measurement signal, involves complicated wiring and, because there are a plurality of boards the sensor is relatively large. Generally the production costs of such sensors becomes higher.

Also, even if a sensor is constructed into a single chip as shown in Japanese Patent Laid-Open Publication No. 4-363651, the sensor is connected to outside devices by wires, and thus there are manifested problems with respect to cost or reliability. Problems may include troublesome issues with respect to the replacement of sensor, the requirement of manual labor, a relatively high cost for replacement of parts, and less reliability of connection by connectors.

Further, as described in Japanese Patent Laid-Open Publication No. 9-297832, when the necessity of replacement of sensor is communicated to a worker, if the measuring instrument is used in close proximity to a worker and the sensor is located in a position that is reasonably accessible, the replacement procedure may not present a significant problem. However, when the measurement is performed in remote locations and there are no workers nearby, a worker may not even know if replacement of sensor is necessary. Also, even if the need for replacement is communicated to the worker, the worker still must travel to location of the measuring instrument. The replacement procedure results in increased cost and decreased reliability of the connectors in view of the potential for errors during the manual replacement procedure. Further, for example, if an object to be measured is dangerous medicine, the replacement of sensors may present additional issues such as exposure to the worker and, in such situations it is likely that costs associated with the replacement of sensors would likewise be increased.

Also, in common applications, the measuring instrument may be arranged in place where a hand cannot reach or it is very difficult to replace the instrument by hand. For example, when a sensor is used in places with difficult accessibility, such as underground, underwater, inside of a pipe, or in outer space the measuring instrument could not be used after the useful life of the sensor terminates. Obviously, this is fatal in detection or measurement.

On the other hand, significant investment, the expenditure of development resources and increased risk would be required for development of a sensor device that has a long lifetime and may not be necessary for replacement for a long time. These issues are particularly relevant with respect to the development of a sensible membrane. Therefore, less expensive sensors that can be manufactured by current technology, despite their short lifetime, are frequently used.

DISCLOSURE OF INVENTION

An object of the present invention is to provide an integrated sensor device which is economical due to the sensor structure being integrated into a single chip. A further object of the invention is to provide sensor with an intermediate lifetime length which is also suited for mass production. Another object of the present invention is to provide a measuring system which is able to continuously measure without manual intervention by automatically replacing a degraded sensor by a new one and to make measurements with such integrated sensor device.

An integrated sensor device of the present invention is constructed into a single integrated circuit device comprising a detection unit that has an organic membrane, the characteristics of which are changed through contact with gas or liquid containing the substance to be measured, and a converter for converting the change of the characteristics to electric signal; a control unit for processing the signal representing the measurement result from the detection unit; and an antenna unit for transmitting the signal processed by the control unit to an external location and for receiving energy necessary for the transmission and operations of the detection and control units from an external location.

An integrated sensor device according to an embodiment of the present invention is constructed into a single integrated circuit device comprising a detection unit that consists of an ion sensible FET device for measuring pH concentration in an aqueous solution and a reference electrode; a thermal sensor for correcting the measurement result of the detection unit; a control unit for processing a signal representing the measurement result from the detection unit; and an antenna unit for transmitting the signal processed by the control unit to an external location and for receiving energy necessary for the transmission and operations of the detection and control units from an external location.

According to a preferable embodiment, the control unit has memory for pre-storing correcting information to correct the measurement result of the detection unit, and in operation, the control unit corrects the measurement result in accordance with the correcting information and transmits the corrected measurement result from the antenna unit.

Also, there is provided a reading device which comprises an antenna unit for receiving the measurement result (or corrected measurement result) transmitted from the integrated sensor device of the present invention and for transmitting energy to be supplied to the integrated sensor device; and a display unit for displaying information on the measurement result received from the integrated sensor device through the antenna unit.

A measuring system of the present invention comprises the integrated sensor device as mentioned above; a container for storing a plurality of the integrated sensor devices; an actuator for actuating a predetermined number of the integrated sensor devices stored in the container to be usable and for removing the deteriorated integrated sensor devices; a controller for controlling operation of the actuator based on the decision of whether performance of the integrated sensor device is deteriorated or whether a predetermined time for use terminates; and an antenna unit for receiving the measurement result transmitted from the integrated sensor device in use and for transmitting energy to be supplied to the integrated sensor device.

In a measuring system of the present invention, a plurality of containers, each of which stores the integrated sensor device one by one, may also be used. Preferably, each container has a seal to prevent invasion of gas or liquid from the external environment prior to use, or has absorbent inside to absorb a substance that may deteriorate the integrated sensor device.

For example, a plurality of containers, each of which has a lid partly or wholly made by a thin membrane for sealing the integrated sensor device are provided, together with a gas or a liquid to maintain the integrated sensor device stable may be used.

According to the present invention, there is also provided a container device which comprises storage for storing a plurality of the integrated sensor devices in a sealed condition, or each integrated sensor device may be individually sealed.

According to the integrated sensor device of the present invention, the measurement result of the detection unit is processed by the control unit which is then transmitted to the outside through the antenna unit. The energy necessary for the transmission and the operation of the detection unit and the control unit is supplied through the antenna unit. That is, the transmission of the measurement result and the energy to be supplied are performed by wireless transmission. Therefore, even if the measuring point is changed, it is possible to flexibly correspond to the new measuring point. Also, since the integrated sensor device is constructed into a single integrated circuit device comprising a detection unit, a control unit and an antenna unit, it has a relative small size and the wiring required to connect each unit is also incorporated, which is more suitable for mass production.

As the integrated sensor device of the present invention is constructed into a single chip, the cost can be reduced. Furthermore, because it realizes the transmission and the supply of energy by wireless, problems with respect to the reliability of the connection are reduced and the replacement of the sensor device is easily performed.

In the measuring system of the present invention, the actuator may actuate a predetermined number of the integrated sensor devices stored in the container to be usable. The transmitting and receiving unit may receive the measurement result transmitted from the integrated sensor device when in use and transmit the energy to be supplied to the integrated sensor device. If the performance of the integrated sensor device deteriorates, the controller may decide that the deterioration of performance is significant and activate operation of the actuator. The actuator may then control the removal of the deteriorated integrated sensor device and activate one of the unused integrated sensor devices. That is, the deteriorated integrated sensor device is automatically replaced by a new sensor. Therefore, manual operation is not necessary for the replacement of sensor device. Furthermore sensor devices having short lifetime can be used which, upon deterioration, can be promptly replaced thereby making it possible to realize a continuous measurement for a long period of time without use of the sensor device having long lifetime.

The measuring system of the present invention can be applied even in a place where the manual replacement is difficult or impossible.

Further, the storage of the integrated sensor device in the container can realize the all-purpose measuring system permitting use in many kinds of applications and with a wide range of sensor devices.

BEST MODE FOR CARRYING OUT THE INVENTION

Figure 1:
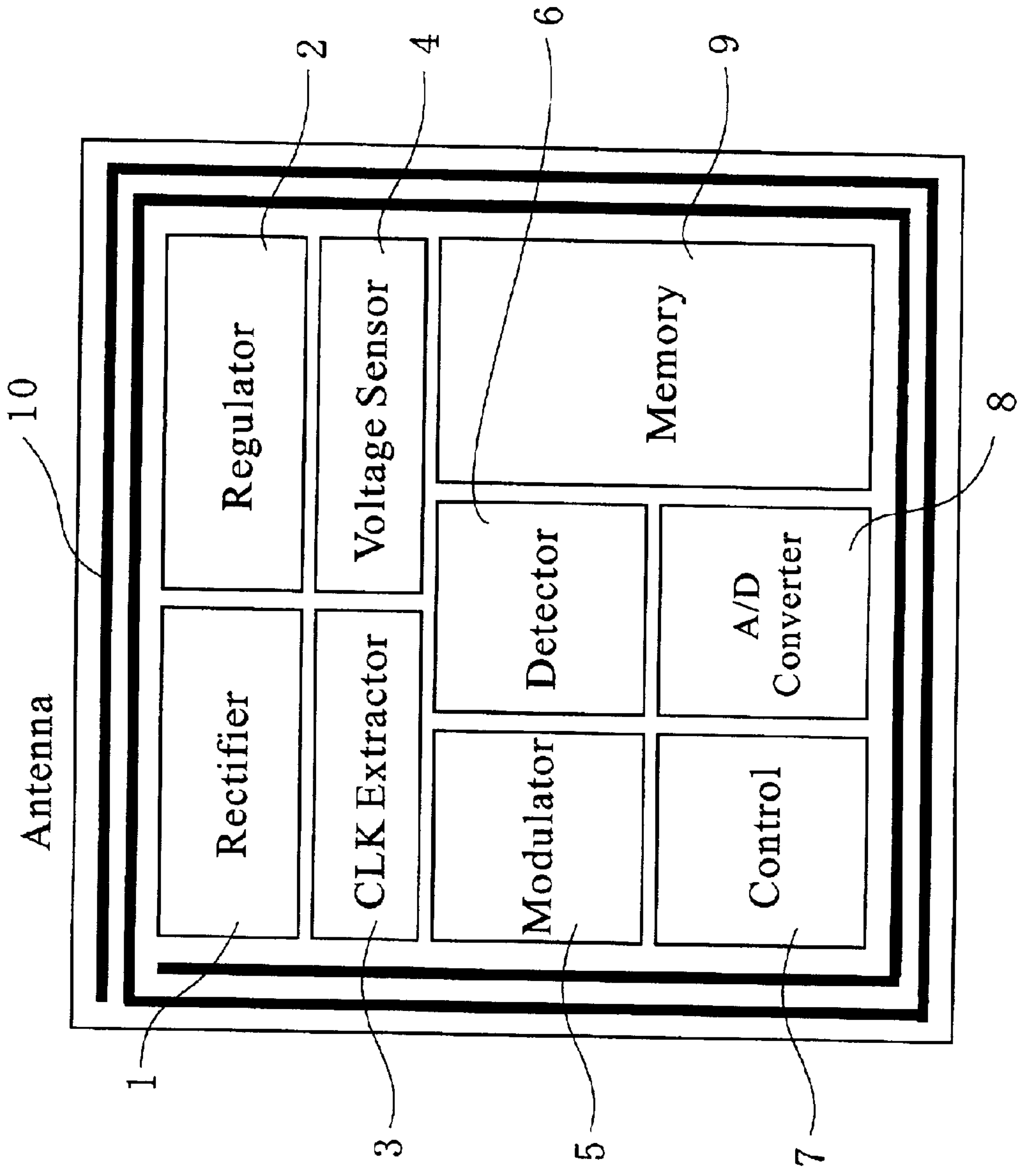
FIG. 1 is an enlarged view schematically showing an embodiment of an integrated sensor device.

FIG. 1 is a enlarged view schematically showing construction of an integrated sensor device according to the present invention. The integrated sensor device is constructed into a single chip. The internal construction of the chip is parted into rectifier unit 1, regulator unit 2, CLK (clock) extraction unit 3, voltage sensing unit 4, modulator unit 5, detection (sensor) unit 6, control unit 7, A/D (analog/digital) converter unit 8, memory unit 9, and antenna unit 10 as to function block.

The sensor unit 6 may be constructed with various kinds of elements. For example, if the quantity of substance to be measured is hydrogen ion or pH, a known ion sensible field effect transistor (ISFET) can be used as the sensor unit. This has a gate constructed by a layer made of oxide and the like, in which a surface potential varies corresponding to a change of concentration of the substance to be measured. In this case, the sensor unit 6 has ISFET and a reference electrode. It outputs a signal, into which the surface potential of the gate oxide layer of ISFET is converted by FET, as the measurement result of pH.

The sensor unit 6 may also have an organic membrane that has characteristics that will change in response to changes in the concentration of the substance to be measured, and a conversion unit to convert the characteristic change to the electric signal. The sensor unit 6 can be used for measurement of value of resistance or capacitance by an arched type electrodes, measurement of value of capacitance by a parallel plate electrodes, or detection of change of weight by QCM (Quartz Crystal Microbalances), change of weight by SAW (Surface Acoustic Wave) device, change of weight by a cantilever, and the like. In this case the sensor unit 6 converts a physical quantity of gas concentration, stress, elastic coefficients and the like to an electric signal and outputs the signal as the measurement result.

The control unit 7 processes the signal showing the measurement result and also corrects the measurement result (for example, correction for calibration). Information required for correction (hereinafter, "correction information") is stored in the memory unit 9. For example, information on zero point of each sensor device, measuring range (span), temperature characteristics and the like is stored. Based on the information of zero point, span and the like, the measurement data can be converted correspondingly to characteristics of the individual sensor. In addition, if a thermal or temperature sensor is also integrated or arranged outside, then it is possible to correct the temperature information due to the temperature characteristic of the individual sensor. The correction information includes a program for the signal processing in addition to the information of span. The control unit 7 may corrects the measurement result according to the program.

When a plurality of integrated sensor devices are used simultaneously, a sensor unit may be formed by a different element in each device. In this case, ID (Identification) information to identify the integrated sensor device is stored in the memory unit 9. The ID information is transmitted to an outside device (for example, a reading device as mentioned later) together with the measurement result. The outside device can read the ID information to identify the measurement result transmitted from the integrated sensor device itself or the sensor device. Also, it is possible to prevent the outside device from reading the wrong data and information with no relation to the measurement result. The use of such ID information can advance the reliability of the measurement.

The antenna unit 10 transmits the measurement result to the outside device and also receives energy supplied by microwaves from outside. The energy supplied through the antenna unit 10 is converted to the electric current, voltage or clock signal that is necessary to operate each unit of the integrated sensor device by the rectifier unit 1, the regulator unit 2, the CLK extraction unit 3 and the voltage detection unit 4, respectively.

Figure 2:
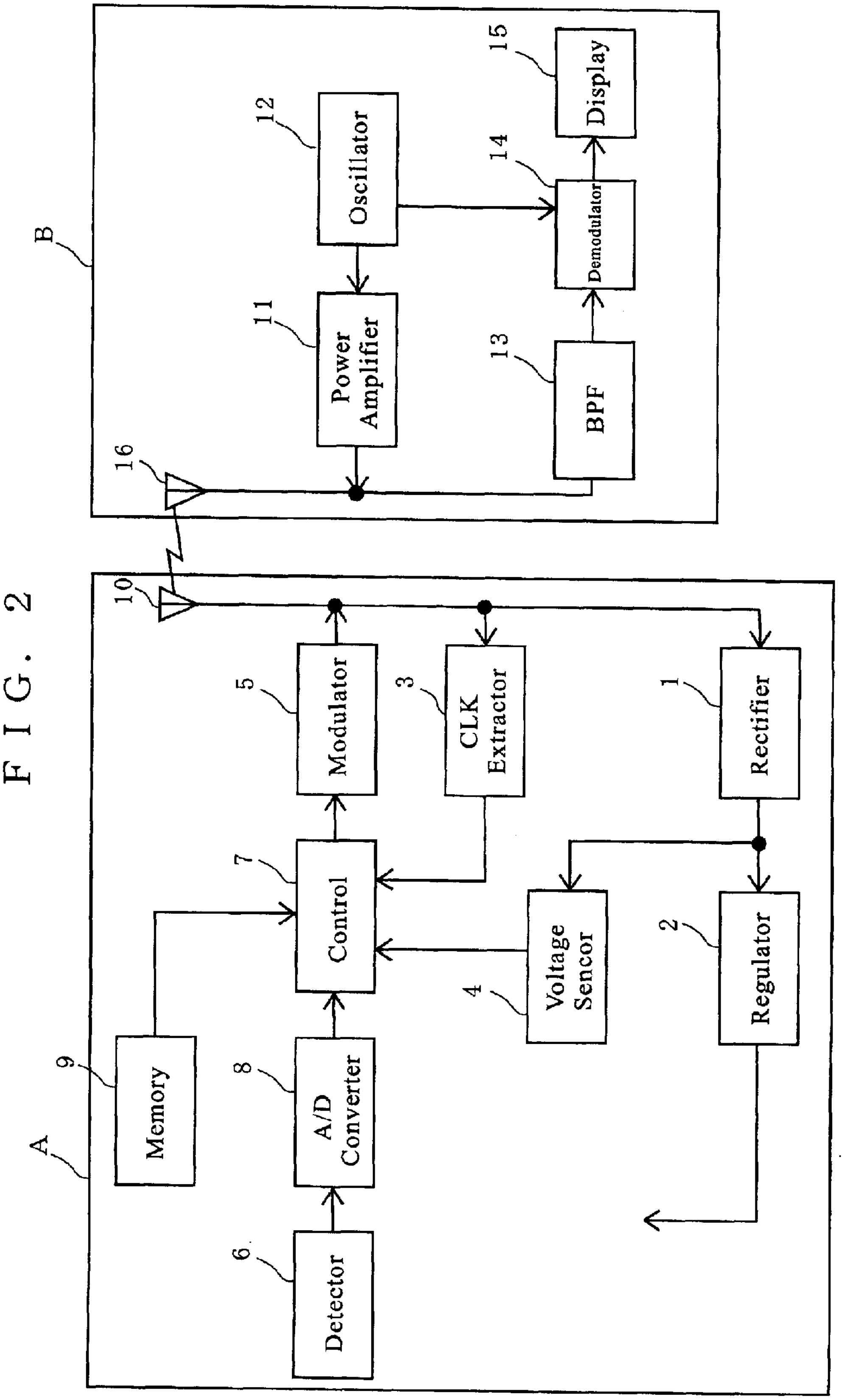
FIG. 2 is a block diagram showing an embodiment of an integrated sensor device and a reading device of FIG. 1.

FIG. 2 is a block diagram showing a construction of the integrated sensor device and the reading device of FIG. 1. The integrated sensor device A and the reading device B transmit and receive the measurement result or energy with each other.

The function of the integrated sensor device A will be explained below.

The sensor unit 6 outputs the measurement result as a detection signal (analog signal) varying continuously. The detection signal is converted into digital signal by A/D converter unit 8.

The control unit 7 carries out any necessary processing of the signal (the detection signal) representing the measurement result. If correction is necessary in the processing step, the control unit 7 refers to the correction information stored in the memory unit 9 and carries out the correction. A correlation of "before processing" and "after processing" of the detection signal, that is, a relationship between input and output in the control unit 7, is not limited to linear relationships and it is contemplated that it may be non-linear. Further, the measurement result may be corrected in the outside device that receives the detection signal, apart from the integrated sensor device.

The modulator unit 5 modulates carrier wave of the signal processed in the control unit 7. The modulated carrier wave is transmitted from the antenna unit 10 and is received by the antenna unit 16 of the reading device B.

Energy is supplied to the integrated sensor device A from the outside device (the reading device B in an example shown). An electromagnetic wave is used for transmission and reception of the measurement result and energy between the antenna unit 10 of the integrated sensor device A and the antenna unit 16 of the reading device B. The CLK extraction unit 3 extracts a clock signal from the received electromagnetic wave. The control unit 7 can operate based on the clock signal.

Energy supplied through the antenna unit 10 is rectified in the rectifier unit 1, and the voltage is regulated in the regulator unit 2. A direct current rectified in such way becomes power for actuating each unit. The voltage sensing unit 4 gives a signal representing that voltage reaches to predetermined level to the control unit 7 to permit the unit to operate only when it may operate.

The function of the reading device B will be explained below. The transmitted carrier wave from the integrated sensor device A is received at antenna unit 16 and is inputted to BPF (Band Pass Filter) unit 13. The BPF unit 13 may remove extra components from the frequency component of the carrier wave. That is, only a predetermined frequency component including information of the processed measurement result is extracted. The carrier wave having extra frequency components that have been removed is inputted to demodulation unit 14, in which the measurement result is taken out from the carrier wave with frequency oscillation of oscillator 12, and is indicated at display unit 15. The display unit 15 may also indicate the result of other signal processing on the detection signal. The frequency signal from the oscillator 12 is amplified in amplifier unit 11 and transmitted as an electromagnetic wave or other microwave from the antenna unit 16 to the integrated sensor device A.

Figure 3:
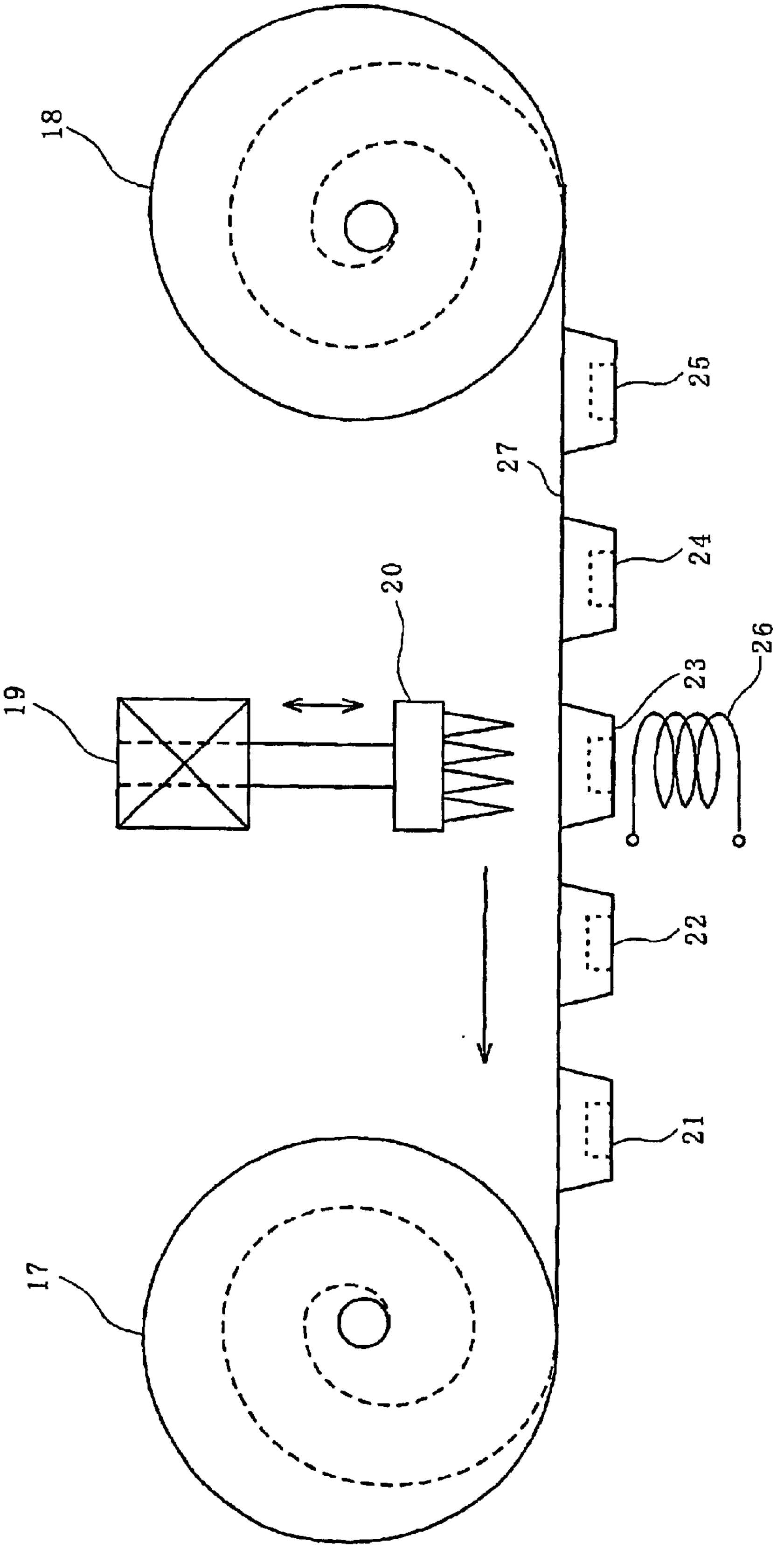
FIG. 3 is a view showing an embodiment of a measuring system.

FIG. 3 shows an example of the measuring system according to the present invention. This measuring system includes take-up reel 17, supply reel 18, actuator 19, perforator 20, container 21–25, membrane seal 27 and transmitter & receiver unit 26.

An integrated sensor device (hereinafter "sensor chip") is accommodated or stored in each container. As will be mentioned later, the sensor chip in the container is isolated from outside by a membrane seal 27. The membrane seal is opened by perforator 20 when using the sensor. The transmitter-receiver unit 26 receives the measurement result transmitted from the sensor chip in use (in container 23) and also sends energy to supply to the sensor chip.

The take-up reel 17 and the supply reel 18 are interlocked with each other by means for joining the containers into a belt with the membrane seal 27 (hereinafter "band of containers"). The band of sealed containers is wound up by the supply reel 18. On the other hand, the used band of containers is wound up by the take-up reel 17. These are rotated by a motor or the other drive source. The band of the containers is driven to run one by one container in a forward direction as shown by an arrow in FIG. 3. The perforator 20 is arranged to be reciprocally driven by the actuator 19 between the take-up reel 17 and the supply reel 18. The perforator 20 can open a lot of apertures in the membrane seal fixed on an upper surface of container 23 for use.

Figure 4:
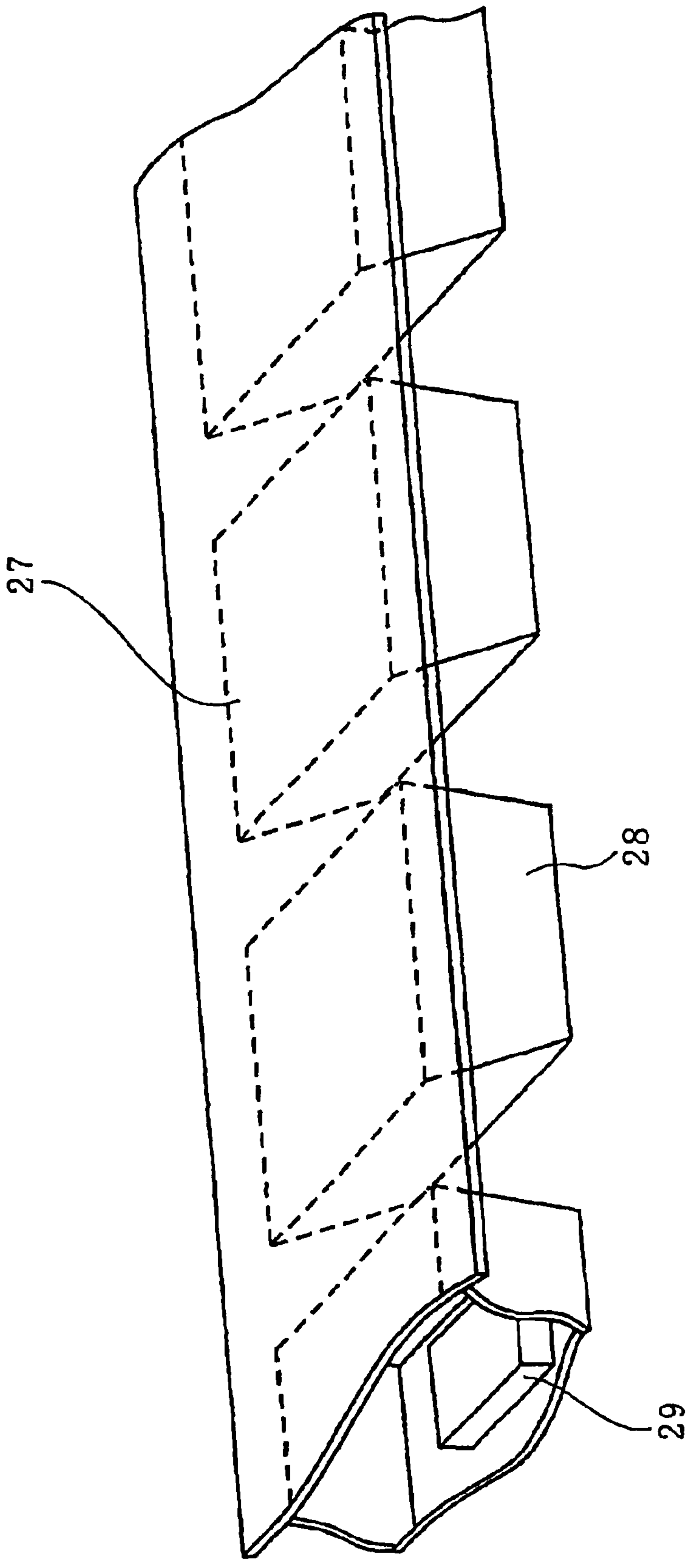
FIG. 4 is an enlarged perspective view of a container in the measuring system of FIG. 3.

FIG. 4 is an enlarged perspective view of the containers in the measuring system of FIG. 3.

A container 28 is made by vacuum molding recess on soft plastic of vinyl chloride or the like. The membrane seal 27 consists of membrane of vinyl chloride or the like and it makes thermally contact bonding to the upper ends of the containers to seal the insides thereof. A sensor chip 29 is housed in the sealed container together with deoxidization material or moisture absorption materials (not shown).

In addition, materials of the container 28 and the membrane seal 27 may not be limited to vinyl chloride, but may be ones that can prevent air, moisture and gas to pass through. For example, they may be substituted by composite materials consisting of thin aluminum layer and macromolecular material, or aluminum foils. Also, one laminated by macromolecular materials having different characteristics is usable.

Figure 5:
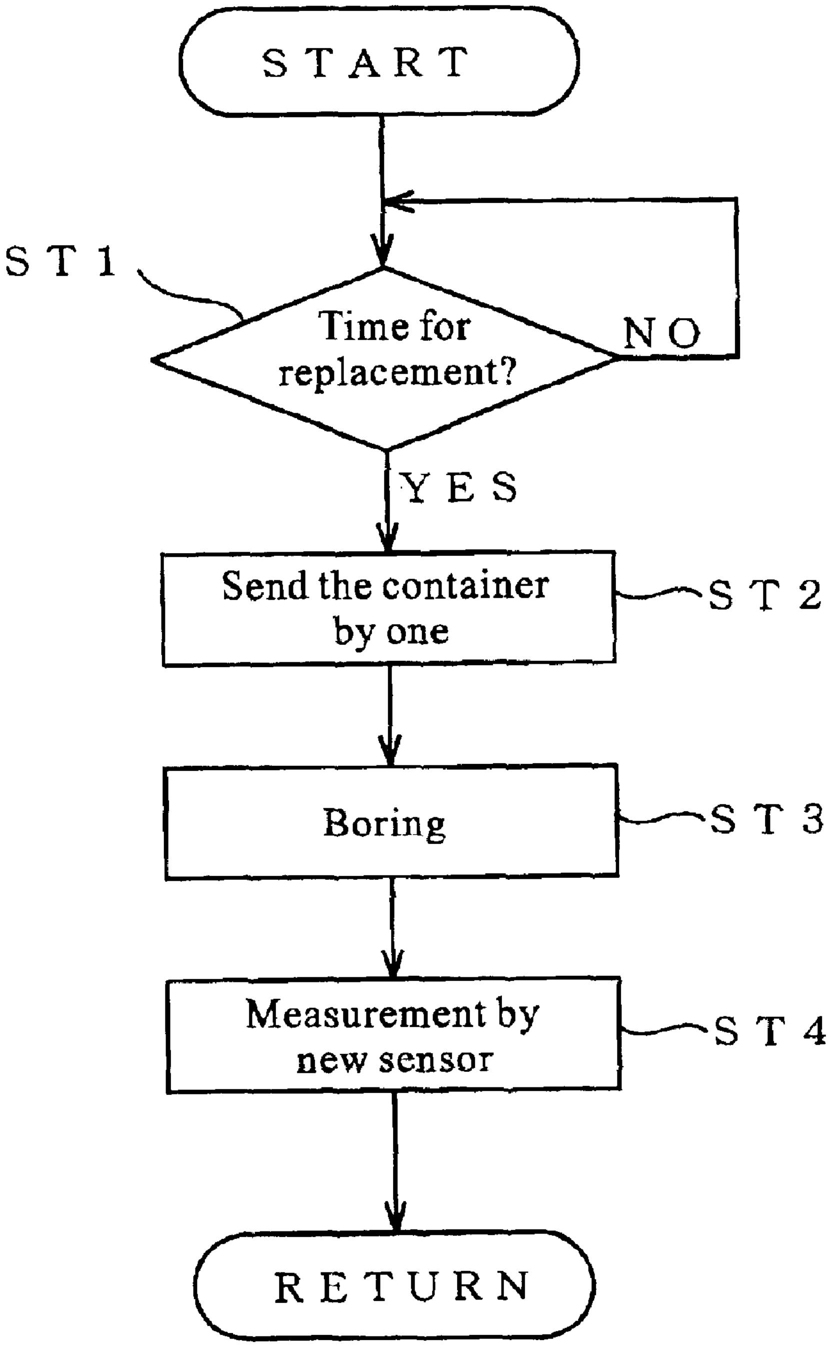
FIG. 5 is a flowchart showing operation of the measuring system of FIG. 3.

FIG. 5 is a flowchart showing operation of the measuring system of FIG. 3.

The time for replacement of the sensor is decided by a controller (ST1). If the controller decides that the sensor should be replaced, or "YES", it gives instruction to operate to the motor for driving the take-up reel 17. Then, the belt of the container is sent only by one stroke of container (ST2) to position the sealed container 23 under the perforator 20. Next, the controller gives instruction to operate to the actuator 19. Then, the perforator 20 turns down to bore an aperture in the membrane seal 27 of the container 23 (ST3). Then, a fresh air comes to contact with the sensor chip stored inside of the container. That is, the sensor chip becomes the state it can be used. Thus the characteristics of the outside environment is measured by the sensor chip (ST4).

By the way, another general problem associated with ion sensors using ion sensitive organic membranes is that they are not stable when use is initiated after it has been kept in a dry atmosphere. Therefore, such a sensor will be stabilized by dipping it in suitable solution over one night before it is used (that is called "conditioning"). Thus, when such sensor is used, it is preferable to fill the sensor chip container of the above embodiment with the solution for conditioning and to store the sensor chip therein. For example, if it is a "Na" ion sensor, it is kept in Nacl solution of 0.1N.

Figure 10:
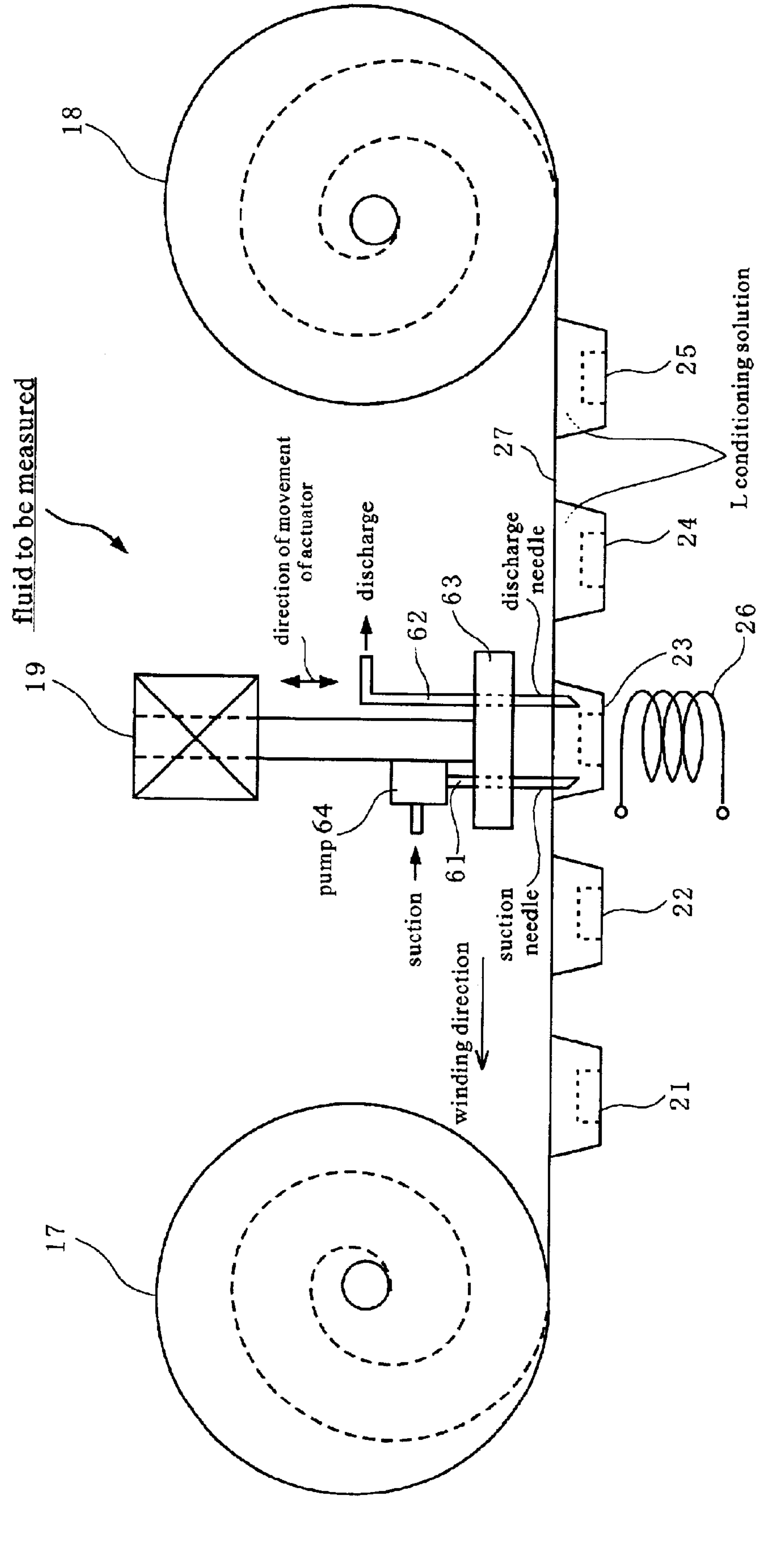
FIG. 10 is a view showing a further embodiment of a measuring system.

In this case the following means can be used instead of the perforator 20 in the system of FIG. 3. That is, as shown in FIG. 10, when the whole system is in fluid to be measured and the quantity of substance and the like is measured, a suitable holding member 63 holds tube 61 for suctioning fluid and tube 62 for discharging fluid in the vertical direction. The suction tube 61 is provided with pump 64, suction needle 61*n* and discharge needle 62*n* are fixed at lower end of each tube respectively, and the holding member 63 is moved reciprocally by the actuator 19. On the other hand, the sealed containers 24, 25 in the side of the supply reel 18 are filled with the conditioning solution L and holds the sensor chip therein.

In the system of FIG. 10, if it is decided that the sensor chip should be replaced as mentioned above, the take-up reel 17 is driven to position the container 23 storing an unused sensor chip just under the suction needle 61*n* and the discharge needle 62*n*. Then, the suction needle 61*n* and the discharge needle 62*n* are lowered by the actuator 19 to make apertures in the membrane seal 27 of the container 23. Further, the fluid to be measured is suctioned from the suction tube 61 by operating pump 64 to enter in the container 23 through the suction needle 61*n*, then the conditioning solution L filled in the container runs through the discharge needle 62*n* to the discharge tube 62, and is discharged from the upper end. In this way the container 23 is filled with the fluid to be measured and the sensor chip stored therein comes to contact with the fluid to be measured. That is, it is possible to replace the fluid in the container immediately to have the sensor chip set in the state it can used. The pump 64 may always operates or may be operated intermittently only when necessary.

In addition, it is preferable to arrange an suction inlet and a discharge outlet at remote position so that the drained fluid can not be suctioned again.

Though the above-mentioned measuring system is constructed to use only one sensor chip (in FIG. 10, a sensor chip stored in the container 23) for measurement, any sensor chip (for example, one in a prior container 22) can be used other than that sensor. That is, with arrangement of the transmit-reception unit 26 under the additional sensor chip, it will be possible to measure by means of two sensors. In this case, if a sensor in use should be replaced, another sensor can also be used so as to measure with simultaneous use of two sensors, and on decision of which degree is the difference between the measurement data of two sensors, the reliability (measurement data) of the sensor which has been used can be checked. According to a result of the check, the measurement with an old sensor is stopped at a predetermined time so that the sensor can be withdrawn.

Figure 6:
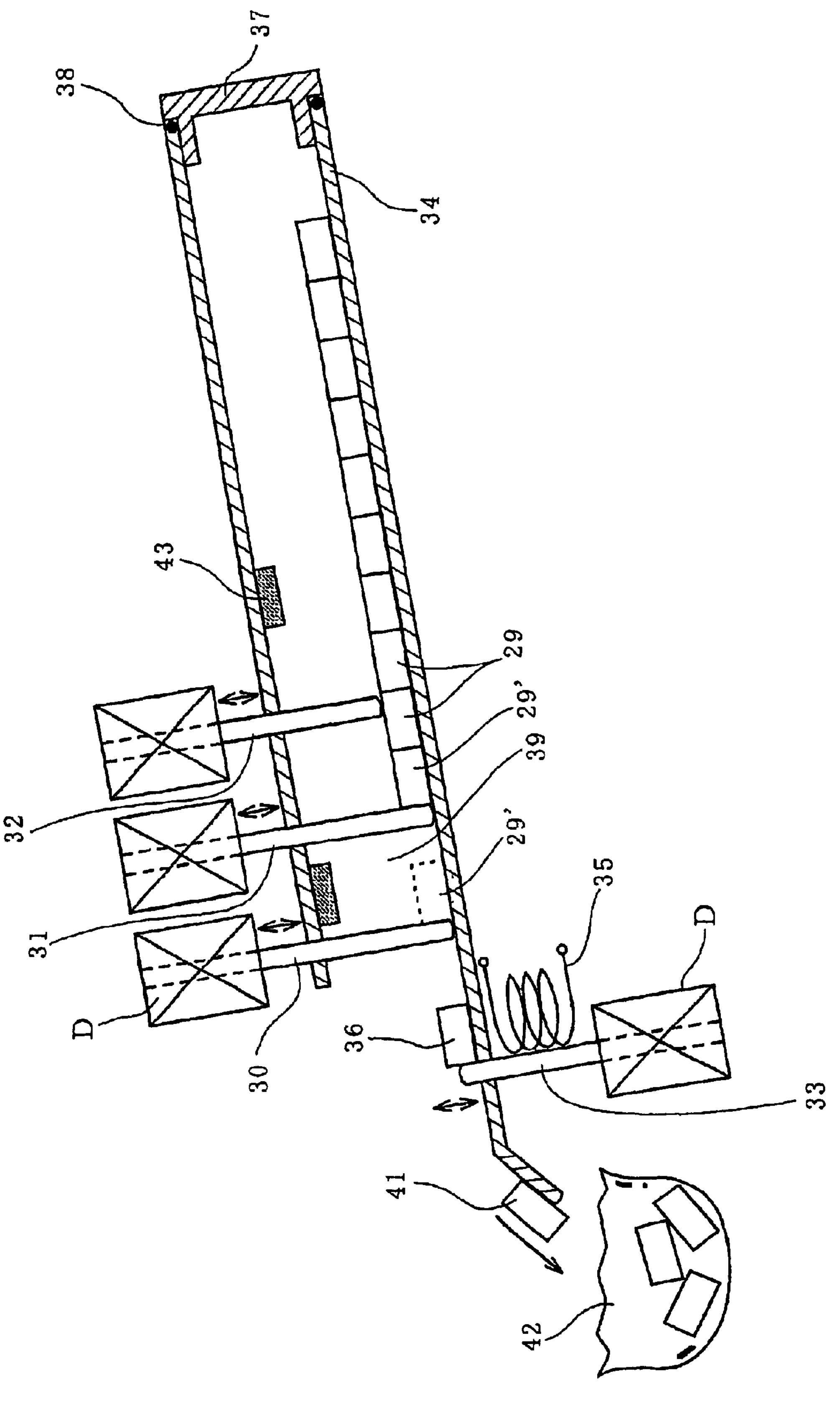
FIG. 6 is a view showing another embodiment of a measuring system.

FIG. 6 shows another measuring system. This measuring system has shutters 30, 31, stoppers 32, 33, storage device 34, and transmission & reception unit 35.

The storage device 34 is formed by a hollow box-shaped member or container in which a plurality of sensor chips 29 are lined up. The container 34 is inclined slightly against the horizontal. An inner wall of the container 34 is made by material having less friction with the sensor chip so that the sensor chip comes to slip by gravity at a slope. The inside of container 34 is sealed with screw lid 37, seal ring 38 and the shutters 30, 31 to maintain complete seal to outside. Further, absorbent 43 for removing oxygen or moisture is disposed in the container 34 so that unused sensor chip 29 is prevented from deterioration.

The shutters 30, 31 and the stoppers 32, 33 are arranged usually in closed position shown in FIG. 6, and the unused sensor chip 29 is hold in the container 34 sealed by the second shutter 31. When the sensor chip is replaced, the shutters 30, 31 and the stoppers 32, 33 slide in a direction as shown by an arrow. For example, the sliding can be realized by drive mechanism D such as solenoid. Seal is complete in place where the shutters 30, 31 in the container 34 and the first stopper 32 are driven. Accordingly, a fresh air can not enter into the container through such sliding portion.

Usually the sensor chip 29 is not accommodated in a pre-chamber 39 that is space sealed by the first shutter 30 and the second shutter 31, but the second shutter 31 is lifted when the sensor chip is replaced as mentioned later. On the other hand, as the first shutter 30 keeps in the lower position, a fresh air can not enter in the preservation chamber, thus the unused sensor chips in the preservation chamber can be kept for a long time.

A sensor chip 36 which is used outside of the container 34 is fixed to a predetermined position by the second stopper 33 and energy is supplied from the transmission and reception unit 35. A measurement result of the sensor chip 36 is transmitted from the transmission and reception unit 35. Further, sensor chip 41 used up is withdrawn to a collection bag 42.

Figure 7:
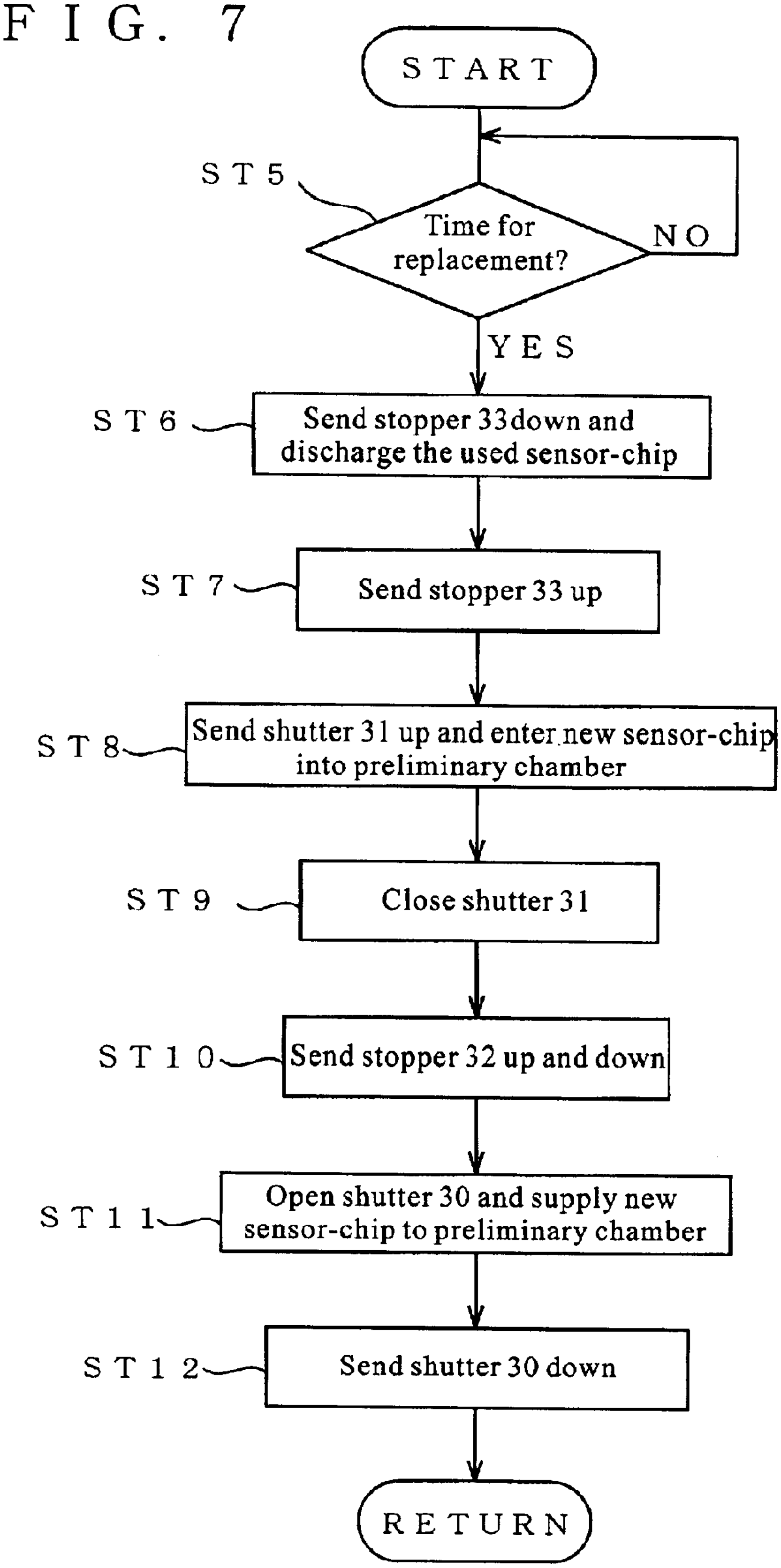
FIG. 7 is a flowchart showing an operation of the measuring system of FIG. 6.

FIG. 7 is a flowchart showing an operation procedure of the shutters 30, 31 and the stoppers 32, 33 in the measuring system of FIG. 6.

At first the controller decides the time for replacement of the sensor chip 36 in use (ST5). If "YES", i.e., the time for replacement has come, then the second stopper 33 is dropped to discharge the used sensor chip 36 (ST6). The discharged sensor chip 41 comes to slide down to the collection bag 42 as shown in FIG. 6. Then, the second stopper 33 is lifted to the original position (ST7).

The second shutter 31 is lifted and now sensor chip 29' at top slips down to the pre-chamber 39 from the container 34 (ST8). At this time, next and other sensor chips 29 are locked in the preservation container 34 by the first stopper 32. After the second shutter 31 drops to close (ST9), the first stopper 32 is lifted and when a first sensor chip 29 is stopped by the second shutter 31, the first stopper 32 drops to lock next sensor chip 29 (ST10).

Next, the first shutter 30 is lifted to move the sensor chip 29' in the pre-chamber 39 to a position (36) for use(ST11). Then, the first shutter 30 is lowered to close the pre-chamber 39 (ST12). Here, it is preferable to remove fluid and moisture of the pre-chamber 39 exposed to outside.

As mentioned above, the sensor chips in the storage device are taken out one by one to the outside for use when the replacement of sensor chip is necessary.

Figure 8:
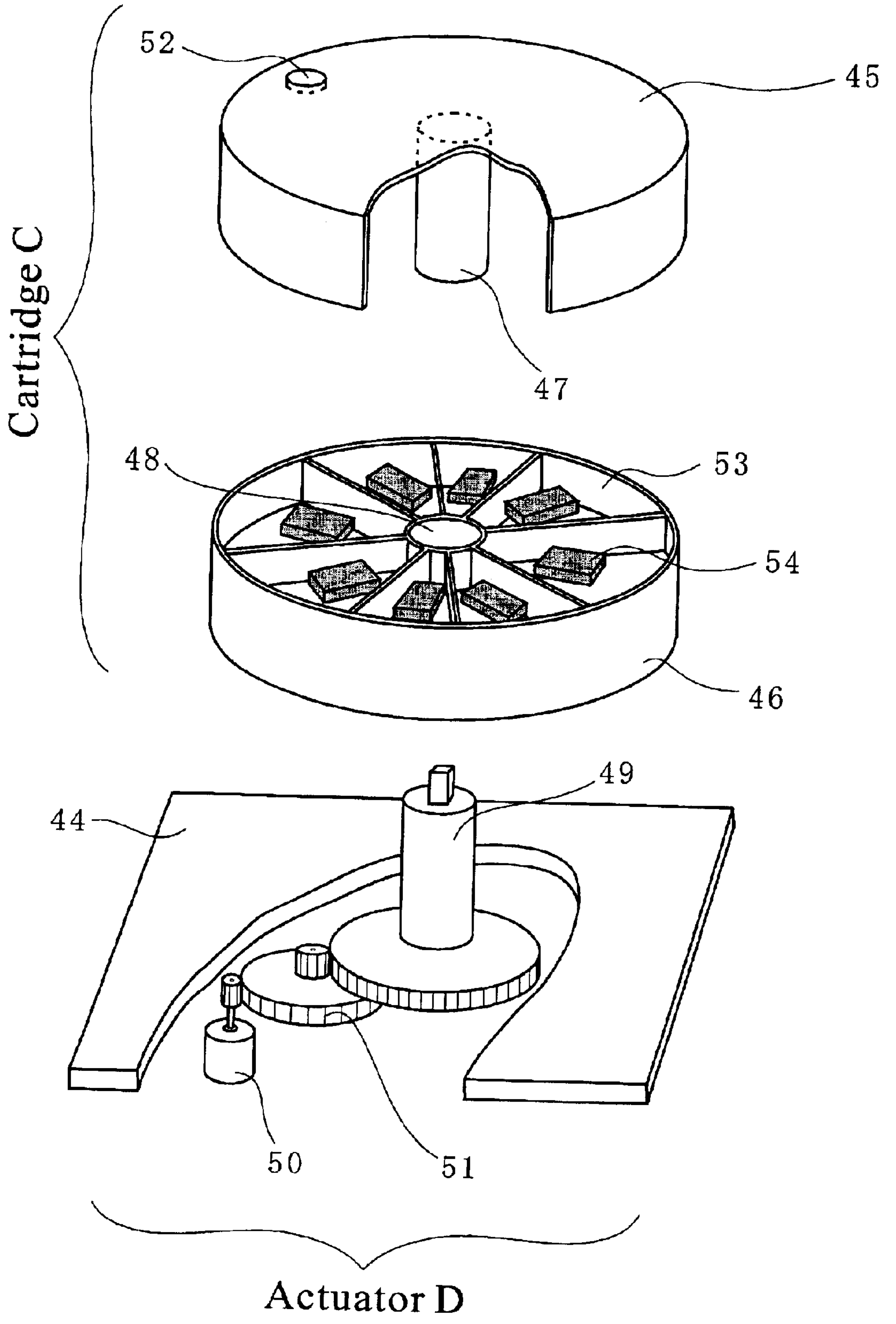
FIG. 8 is a view showing other embodiment of a measuring system.

FIG. 8 shows another measuring system. This measuring system includes cartridge C, base 44 and actuator D.

The cartridge C consists of an upper case 45 and a lower case 46. A shaft 47 of the upper case 45 rotatably engages with bearing 48 of the lower case 46 and also with main shaft 49 as mentioned later. In use, the upper case 45 is combined with the lower case 46 into a unit.

The actuator D has motor 50, reduction gear 51 and main shaft 49 to be constructed. The reduction gear 51 adjusts number of rotation to transmit power of the motor 50 to the main shaft 49. The actuator is disposed in backside of the base 44. The main shaft 49 penetrates the base 44 to engage with the upper case 45 of the cartridge C. The power of motor 50 is transmitted via the main shaft 49 to the upper case 45.

A penetration aperture 52 is formed in the upper case 45. A plurality of small chambers 53 are arranged in the lower case 46. A sensor chip 54 is put in each of small chambers 53. It is preferable to put absorbent for absorbing humidity and oxygen together with the sensor chip in each small chamber. In measuring, the upper case 45 is combined with the lower case 46 to keep seal of each small chamber 53. The sensor chip 54 located just under the penetration aperture 52 is exposed in fresh air. The sensor chip exposed in fresh air transmits and receive the measurement result or energy between transmission and reception unit (not shown).

The upper case 45 engages with the main shaft 49 as mentioned above while the lower case 46 is fixed to the base 44. The lower case 46 can be attached to and detached from the base 44. The upper case 45 rotates by a predetermined angle by the motor 50 so that the sensor chip is located just under the penetration aperture 52. That is, this embodiment has mechanism to replace with next new sensor chip by turning the upper case 45 when a lifetime of the sensor chip is over.

Further, the cartridge C may engage detachably with the base 44. Therefore, an existing cartridge can be replaced by a new cartridge when lifetime of all sensors 54 put in the small chamber 53 is over.

Figure 9:
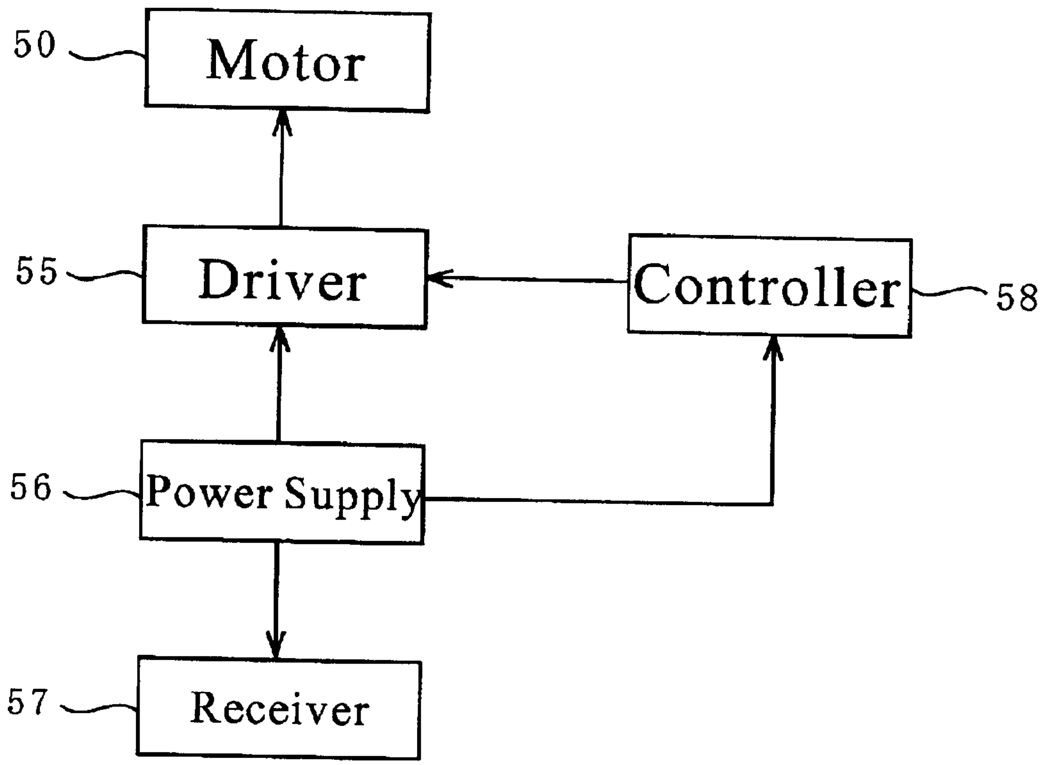
FIG. 9 is a block diagram showing a procedure of electric power supply to the measuring system of FIG. 8.

FIG. 9 is a block diagram showing an electric power supply to the measuring system of FIG. 8.

Controller 58, driver 55 and reception circuit 57 are driven by electric power supplied from power source 56. The controller 58 checks lifetime of the sensor chip and gives instruction for operation to the driver 55 appropriately. The driver 55 controls operation of the actuator D of FIG. 8. More specifically, turn of the motor 50 is controlled so that the main shaft 49 of FIG. 8 rotates by a predetermined angle. As a method of control, potentiometers may be used for feedback control, or pulse motor may be used for open control. In addition, a receiver circuit 57 is a circuit for receiving the measurement result by the sensor chip 54 of FIG. 8 and for supplying energy to the sensor chip.

Though the embodiments of integrated sensor device and measuring system have been explained above, shape of the sensor chip, shape of the container, method of driving the actuator and so on are not limited to the embodiments.

For example, in the integrated sensor chip of FIG. 1, the sensor unit 6 may be constructed with a plurality of sensors. The sensors can measure pH and each ion of Na, K, Ca. In this case, since the reference electrode or the temperature sensor for compensation integrated in one chip can be used together and also can be produced all at once, it is more advantageous in cost than a plurality of integrated sensors that are made for each of different objects to be measured.

The integrated sensor device and the measuring system according to the present invention can used for measurement of various physical quantities, and in particular they are preferable for a manure monitor in hydroponics and the other environmental measurements.

What is claimed is:

1. An integrated sensor device which is constructed into a single integrated circuit device comprising a detection unit that has an organic membrane, characteristics of which are changed through contact with gas or liquid containing substance to be measured, and a converter for converting the change of the characteristics to electric signal; a control unit for processing the signal representing the measurement result from the detection unit; and an antenna unit for transmitting the signal processed by the control unit to outside and for receiving energy necessary for the transmission and operations of the detection and control units from the outside, wherein the control unit has memory for pre-storing correcting information to correct the measurement result of the detection unit, and in operation the control unit corrects the measurement result in accordance with the correcting information and transmits the corrected measurement result from the antenna unit.

2. A reading device comprising:

an antenna unit for receiving the measurement result transmitted from the integrated sensor device according to claim 1, and for transmitting energy to be supplied to the integrated sensor device; and a display unit for displaying information on the measurement result received from the integrated sensor device through the antenna unit.

3. A measuring system comprising:

the integrated sensor device according to claim 1;

a container for storing a plurality of the integrated sensor devices;

an actuator for actuating predetermined number of the integrated sensor devices stored in the container to be usable and for removing the deteriorated integrated sensor device;

a controller for controlling operation of the actuator based on decision of whether performance of the integrated sensor device is deteriorated or predetermined time for use terminates; and an antenna unit for receiving the measurement result transmitted from the integrated sensor device in use and for transmitting energy to be supplied to the integrated sensor device.

4. A measuring system comprising:

the integrated sensor device according to claim 1;

a plurality of containers, each of which stores the integrated sensor device one by one;

an actuator for actuating predetermined number of the integrated sensor devices stored in the container to be usable and for removing the deteriorated integrated sensor device;

a controller for controlling operation of the actuator based on decision of whether performance of the integrated sensor device is deteriorated or predetermined time for use terminates; and an antenna unit for receiving the measurement result transmitted from the integrated sensor device in use and for transmitting energy to be supplied to the integrated sensor device.

5. The measuring system comprising:

the integrated sensor device according to claim 1;

a plurality of containers, each of which has a lid partly or wholly made by thin membrane, for sealing the integrated sensor device one by one inside together with gas or liquid to maintain the integrated sensor device in stability;

an actuator for actuating predetermined number of the integrated sensor devices stored in the container to be usable and for removing the deteriorated integrated sensor device by opening an aperture in the thin membrane of the container;

a controller for controlling operation of the actuator based on decision of whether performance of the integrated sensor device is deteriorated or predetermined time for use terminates; and an antenna unit for receiving the measurement result transmitted from the integrated sensor device in use and for transmitting energy to be supplied to the integrated sensor device.

6. A container device comprising storage for storing a plurality of the integrated sensor devices according to claim 1, in seal.

7. A container device comprising storage for storing the integrated sensor device according to claim 1, in seal one by one.

8. A measuring system comprising:

an integrated sensor device which is constructed into a single integrated circuit device comprising a detection unit that has an organic membrane, characteristics of which are changed through contact with gas or liquid containing substance to be measured, and a converter for converting the change of the characteristics to electric signal; a control unit for processing the signal representing the measurement result from the detection unit; and an antenna unit for transmitting the signal processed by the control unit to outside and for receiving energy necessary for the transmission and operations of the detection and control units from the outside;

a container for storing a plurality of the integrated sensor devices;

an actuator for actuating predetermined number of the integrated sensor devices stored in the container to be usable and for removing the deteriorated integrated sensor device;

a controller for controlling operation of the actuator based on decision of whether performance of the integrated sensor device is deteriorated or predetermined time for use terminates; and an antenna unit for receiving the measurement result transmitted from the integrated sensor device in use and for transmitting energy to be supplied to the integrated sensor device.

9. The measuring system according to claim 8, wherein the container has a seal to prevent invasion of gas or liquid from outside.

10. The measuring system according to claim 9, wherein the container has absorbent inside to absorb substance that deteriorates the integrated sensor device.

11. A measuring system comprising:

an integrated sensor device which is constructed into a single integrated circuit device comprising a detection unit that has an organic membrane, characteristics of which are changed through contact with gas or liquid containing substance to be measured, and a converter for converting the change of the characteristics to electric signal; a control unit for processing the signal representing the measurement result from the detection unit; and an antenna unit for transmitting the signal processed by the control unit to outside and for receiving energy necessary for the transmission and operations of the detection and control units from the outside;

a plurality of containers, each of which stores the integrated sensor device one by one;

an actuator for actuating predetermined number of the integrated sensor devices stored in the container to be usable and for removing the deteriorated integrated sensor device;

a controller for controlling operation of the actuator based on decision of whether performance of the integrated sensor device is deteriorated or predetermined time for use terminates; and an antenna unit for receiving the measurement result transmitted from the integrated sensor device in use and for transmitting energy to be supplied to the integrated sensor device.

12. The measuring system according to claim 11, wherein the container has a seal to prevent invasion of gas or liquid from outside.

13. The measuring system comprising:

an integrated sensor device which is constructed into a single integrated circuit device comprising a detection unit that has an organic membrane, characteristics of which are changed through contact with gas or liquid containing substance to be measured, and a converter for converting the change of the characteristics to electric signal; a control unit for processing the signal representing the measurement result from the detection unit; and an antenna unit for transmitting the signal processed by the control unit to outside and for receiving energy necessary for the transmission and operations of the detection and control units from the outside;

a plurality of containers, each of which has a lid partly or wholly made by thin membrane, for sealing the integrated sensor device one by one inside together with gas or liquid to maintain the integrated sensor device in stability;

an actuator for actuating predetermined number of the integrated sensor devices stored in the container to be usable and for removing the deteriorated integrated sensor device by opening an aperture in the thin membrane of the container;

a controller for controlling operation of the actuator based on decision of whether performance of the integrated sensor device is deteriorated or predetermined time for use terminates; and an antenna unit for receiving the measurement result transmitted from the integrated sensor device in use and for transmitting energy to be supplied to the integrated sensor device.

* * * * *